Feb. 28, 1939.   J. H. McCAULEY   2,149,224
ANIMATED ELECTRICAL DISCHARGE DEVICE
Filed Oct. 10, 1938
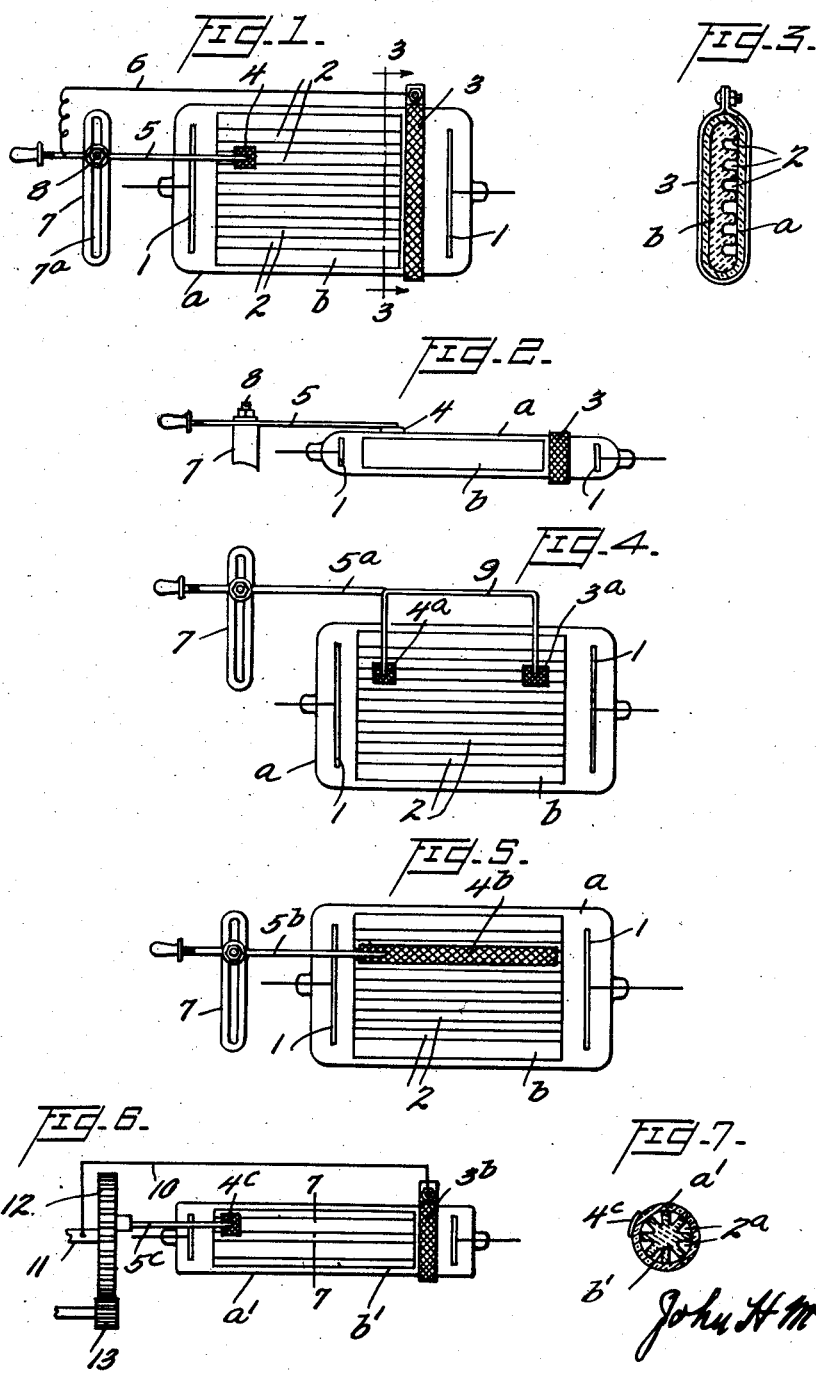

Patented Feb. 28, 1939

2,149,224

UNITED STATES PATENT OFFICE 2,149,224

ANIMATED ELECTRICAL DISCHARGE DEVICE

John H. McCauley, Hillside, N. J., assignor to Joseph F. Frese, Baltimore, Md., as trustee Application October 10, 1938, Serial No. 234,229

6 Claims. (Cl. 176—122)

This invention relates to improvements in animated electric discharge devices. Such a device comprises a closed glass envelope containing a rare gas, such as neon, argon or helium and spaced electrodes, and a filler in that part of the envelope which lies between the electrodes, the filler being composed of insulating material and providing a plurality of passageways through which the discharge may take place, in my co-pending applications Ser. No. 60,496, filed January 23, 1936, upon which Patent No. 2,132,427 has been granted and Ser. No. 96,879, filed August 19, 1936, upon which Patent No. 2,133,205 has been granted, I have shown such devices with means external to the glass or envelope for influencing the course of the discharge.

In the present application, which is a continuation in part of application Ser. No. 118,647, the filler of insulating material within the glass envelope is designed so as to provide a plurality of passageways for the electrical discharge and the external circuit has terminals close to or in actual contact with that part of the tube containing the filler, these terminals being electrically connected together, and one or both of the terminals being adjustable so as to cause the discharge to take place through particular channels, or through all of the channels in succession.

In the accompanying drawing,

Fig. 1 is a plan view of a flattened electrical discharge tube having a filler of insulating material which affords a plurality of channels for the discharge, and having external means for controlling the course of the discharge;

Fig. 2 is a side elevation of the same;

Fig. 3 is a section on the line 3—3 of Fig. 1;

Fig. 4 is a plan view of a similar discharge tube with a modified arrangement of the controlling circuit;

Fig. 5 is a plan view of a similar discharge tube with a different arrangement of the controlling means;

Fig. 6 is a side view of a cylindrical discharge tube having a grooved filler therein and showing a control circuit with one terminal rotatable about the axis of the tube, and, Fig. 7 is a section on the line 7—7 of Fig. 6.

Referring to Figs. 1-3, inclusive, of the drawing, a indicates a glass tube, flattened in form, containing a rare gas, such as neon, argon, or helium, and having electrodes 1 in its ends, which, in practice, are connected to the high tension side of an alternating current transformer. Fitting closely within the tube is a filler of insulating material having in one side a plurality of grooves 2 which constitute passageways for the electrical discharge. The grooves in the filler shown are of approximately the same length and cross-sectional area so that they contain substantially equal columns of gas. In the absence of the control circuit hereinafter described, when the current is turned on, the discharge through the tube may pass through any one of the passageways, producing a line of light, and as the resistance of the gas in that passageway increases because of heating of the gas, the discharge may shift to another channel, or it may divide between several channels if the channels are narrow. Preferably, the channels are made of ample size to provide columns of gas of low resistance, and in that case the discharge may not shift from channel to channel, but keep its course through a single channel and produce a stationary line of light.

By providing a control circuit external to the tube or envelope, I am able to control the course of the discharge so as to maintain it in any desired channel or to cause it to shift from one channel to another, as may be desired. In Fig. 1, this control circuit comprises a stationary metal terminal 3, shown as a gauze band clamped around the outer side of the tube, adjacent one end of the filler, a movable metal terminal 4 which rests against the outer side of the tube adjacent the opposite end of the filler, a metal rod 5 connected to the latter terminal for moving the same, and a conductor 6 connecting this rod with the stationary terminal 3. The stationary terminal extends transversely over all of the grooves, while the movable terminal has the width of a single groove only, although it may be narrower or slightly wider than the width of a channel. The rod 5 is conventionally shown mounted on a suitable support 7 to which it is slidably connected by a bolt 8 movable in a guide slot 9.

When the current is applied to the electrodes in Fig. 1, the discharge will take place through the passageway over which the terminal 4 may be placed. If this terminal extends equally over two passageways, the discharge may take place through either, shifting from one to the other, or if it extends over only one passageway, the discharge will follow that passageway. The terminal 4 may be moved back and forth transversely of the channels, and this will cause shifting of the discharge from channel to channel. This movement may be accomplished by moving the metal rod 5 by hand, or a clock mechanism or motor may be arranged to effect this movement. It would appear from this that a condenser action is set up between the electrified gas within the glass envelope and the connected terminals on the outer side of the envelope and that this reduces the resistance of the column of gas in the channel or channels over which the terminal may be placed; but I do not confine myself to any particular theory concerning the action, which can be observed by the appearance of broad lines of light in the particular channels. This method of controlling the discharge by causing it to flow through any one of a number of particular passageways has a commercial value aside from the luminous effects, as it may be used for switching or controlling other circuits external to the tube.

In the modification Fig. 4, the stationary terminal 3 of Fig. 5 is omitted, and two simultaneously movable terminals 3ª and 4ª, each substantially equal in width to that of one of the channels, are connected together mechanically and electrically by a U-shaped wire 9, connected to a rod 5ª which is slidable along the slotted circuit 7. These terminals are connected mechanically so that they will be in alinement over the end portions of the individual channels in succession as they are moved across the ends of the filler. The result is the same as in Figs. 2 and 3, that is, the discharge will take place through the channel with which the terminals are at any time alined, and this will be evidenced by the production of a luminous line in said channel.

In the modification Fig. 5, a narrow conductive strip 4ᵇ, preferably of copper gauze, is arranged on the outer side of the glass envelope and extends from end to end of the filler portion. This conductive strip is connected to a rod 5ᵇ by which it may be moved into position over any one of the channels. This strip serves the purpose of the two connected terminals in Fig. 4, causing the discharge to take place through whichever channel the strip is in alinement with.

In Figs. 6 and 7, the glass envelope a' is cylindrical in form and it contains a grooved filler b' which fits closely within the tube, the grooves 2ª forming channels for the electrical discharge. A stationary terminal 3ᵇ consisting of a metal gauze strip extends around the tube at one end of the filler and this strip is electrically connected to a small terminal 4ᶜ at the opposite end of the filler, this latter terminal being mounted so that it may be moved circumferentially about the tube to cause the discharge to flow through the channels and produce bands of light in them in succession. As shown conventionally, the terminal 3ᵇ is connected by a conductor 10 to a shaft 11 which is in line with the axis of the tube a' and on this shaft is a metal gear wheel 12, driven by a pinion 13. The terminal 4ᶜ is carried by a metal rod 5ᶜ which is secured to the gear wheel 12 and rotates with it, causing the terminal 4ᶜ to revolve about the tube; and as it revolves the discharge will take place through the channels in succession.

While I have shown fillers with parallel channels, the filler may be of any shape, so long as it provides a plurality of passageways for the electrical discharge. The adjustment of the terminals of the external circuit in the manner described will influence the course of the discharge through the passageways formed in or by any filler of insulating material.

What I claim is:

1. A luminous electric discharge device comprising a closed glass envelope containing a rare gas and spaced electrodes, a filler of insulating material within the envelope between said electrodes, said filler affording a plurality of passageways for the electrical discharge, and means for influencing the course of the discharge comprising an electric conducting member in contact with or closely adjacent the outer side of the tube at the part thereof containing the filler, said member being movable transversely of the filler.

2. A luminous electric discharge device comprising a closed glass envelope containing a rare gas and spaced electrodes, a filler of insulating material within the envelope between said electrodes, said filler affording a plurality of passageways for the electrical discharge, and means for influencing the course of the discharge comprising a circuit having terminals spaced apart longitudinally of the filler, said terminals being in contact with or closely adjacent the outer side of the tube at the part containing the filler, one of said terminals being movable transversely of the filler.

3. A luminous electric discharge device comprising a closed glass envelope containing a rare gas and spaced electrodes, a filler of insulating material within the envelope between said electrodes, said filler affording a plurality of passageways for the electrical discharge, and means for influencing the course of the discharge comprising a circuit having terminals spaced apart longitudinally of the filler, said terminals being in contact with or closely adjacent the outer side of the tube at the part containing the filler, both of said terminals being movable transversely of the filler.

4. A luminous electric discharge device comprising a closed glass envelope containing a rare gas and spaced electrodes of solid material and a filler of insulating material within that part of the envelope which lies between said electrodes, said filler having a plurality of passageways for the electrical discharge, and a circuit exterior to the envelope for influencing the course of the discharge comprising two terminals in contact with or closely adjacent that part of the envelope containing the filler and spaced apart longitudinally of the envelope, one of said terminals being movable transversely of the passageways.

5. A luminous electric discharge device comprising a closed glass envelope containing a rare gas and spaced electrodes of solid material and a filler of insulating material within that part of the envelope which lies between said electrodes, said filler having a plurality of passageways for the electrical discharge, and a circuit exterior to the envelope for influencing the course of the discharge comprising two terminals in contact with or closely adjacent that part of the envelope containing the filler and spaced apart longitudinally of the envelope, both of said terminals being movable transversely of the passageways.

6. A luminous electric discharge device comprising a closed glass envelope containing a rare gas and spaced electrodes of solid material and a filler of insulating material within that part of the envelope which lies between said electrodes, said filler having a plurality of passageways for the electrical discharge, and a circuit exterior to the envelope for influencing the course of the discharge comprising two terminals in contact with or closely adjacent that part of the envelope containing the filler and spaced apart longitudinally of the envelope, one of said terminals extending across all of said passageways and the other being smaller and adapted to extend over a smaller number of passageways, the latter terminal being movable transversely of the passageways.

JOHN H. McCAULEY.